(12) United States Patent
Crownover (10) Patent No.: US 12,260,150 B2
(45) Date of Patent: Mar. 25, 2025

(54) AUDIO SYSTEMS AND DEVICES AND RELATED METHODS AND SOFTWARE

(71) Applicant: Robert Lucas Crownover, Austin, TX (US)

(72) Inventor: Robert Lucas Crownover, Austin, TX (US)

( * ) Notice: Subject to any disclaimer, the term of this patent is extended or adjusted under 35 U.S.C. 154(b) by 328 days.

(21) Appl. No.: 17/831,122

(22) Filed: Jun. 2, 2022

(65) Prior Publication Data
US 2022/0405041 A1 Dec. 22, 2022

Related U.S. Application Data

(60) Provisional application No. 63/212,968, filed on Jun. 21, 2021.

(51) Int. Cl.
*G06F 3/16* (2006.01)

(52) U.S. Cl.
CPC .................. *G06F 3/162* (2013.01)

(58) Field of Classification Search
CPC ........... G06F 3/162; G06F 3/165; G06F 3/166
See application file for complete search history.

(56) References Cited

U.S. PATENT DOCUMENTS

| | | | | |
|---|---|---|---|---|
| 7,400,905 B1 * | 7/2008 | Malkin | ................. | H04M 1/724 715/764 |
| 8,630,283 B1 * | 1/2014 | Breau | ................. | H04L 12/6418 455/433 |
| 2007/0021145 A1 * | 1/2007 | Lam | ................. | H04M 1/72448 455/556.1 |
| 2007/0041582 A1 * | 2/2007 | Lam | ..................... | H04M 1/6066 379/908 |
| 2008/0044035 A1 * | 2/2008 | Agrawal | ........... | H04M 1/72403 381/71.1 |
| 2008/0260112 A1 * | 10/2008 | Wright | ..................... | H04M 3/42 379/68 |
| 2010/0239078 A1 * | 9/2010 | Sweeney | ............. | H04M 3/4285 379/101.01 |
| 2016/0073158 A1 * | 3/2016 | Trieber | ................... | H04S 7/308 381/27 |

OTHER PUBLICATIONS

Voicemod Real-Time Voice Changer: www.voicemod.net; available since at least Oct. 2012.

* cited by examiner

*Primary Examiner* — Joseph Saunders, Jr.
(74) *Attorney, Agent, or Firm* — Kolitch Romano Dascenzo Gates LLC (57) ABSTRACT

Audio devices comprise a housing, a first audio connection supported by the housing, a second audio connection supported by the housing, and a controller supported by the housing that is configured to receive an input audio signal via the first audio connection, combine the input audio signal with a sound bite to create an output audio signal, and transmit the output audio signal via the second audio connection. Audio systems comprise an audio device and software that directs a computing device to receive a user input and transmit a sound bite to the audio device responsive to receipt of the user input.

24 Claims, 5 Drawing Sheets

AUDIO SYSTEMS AND DEVICES AND RELATED METHODS AND SOFTWARE

RELATED APPLICATION

This application claims benefit of U.S. Provisional Patent Application No. 63/212,968, filed on Jun. 21, 2021, the complete disclosure of which is incorporated herein by reference.

FIELD

The present disclosure relates to audio systems and devices and related methods and software.

BACKGROUND

Online multiplayer games often permit players to interact with each other, not only virtually with game characters or other game elements, but also through real-time audio connections for voice. That is, connected players often are able to talk to each other while in a virtual game environment.

SUMMARY

Some audio devices according to the present disclosure comprise a housing, a first audio connection supported by the housing, a second audio connection supported by the housing, and a controller supported by the housing. The controller is configured to receive an input audio signal via the first audio connection, combine the input audio signal with a sound bite to create an output audio signal, and transmit the output audio signal via the second audio connection. Some audio systems according to the present disclosure comprise the audio device and software that directs a computing device to receive a user input and transmit the sound bite to the audio device responsive to receipt of the user input.

Some audio devices according to the present disclosure comprise a housing, a first audio connection supported by the housing, a second audio connection supported by the housing, a third audio connection supported by the housing, and a controller supported by the housing. The controller is configured to receive an input audio signal via the first audio connection, transmit the input audio signal via the third audio connection, receive via the third audio connection an output audio signal that is comprised of the input audio signal combined with a sound bite, and transmit the output audio signal via the second audio connection. Some audio systems according to the present disclosure comprise the audio device and software that direct a computing device to receive a user input, receive the input audio signal from the audio device, combine the input audio signal with the sound bite to create the output audio signal responsive to receipt of the user input, and transmit the output audio signal to the audio device.

DESCRIPTION

Figure 1:
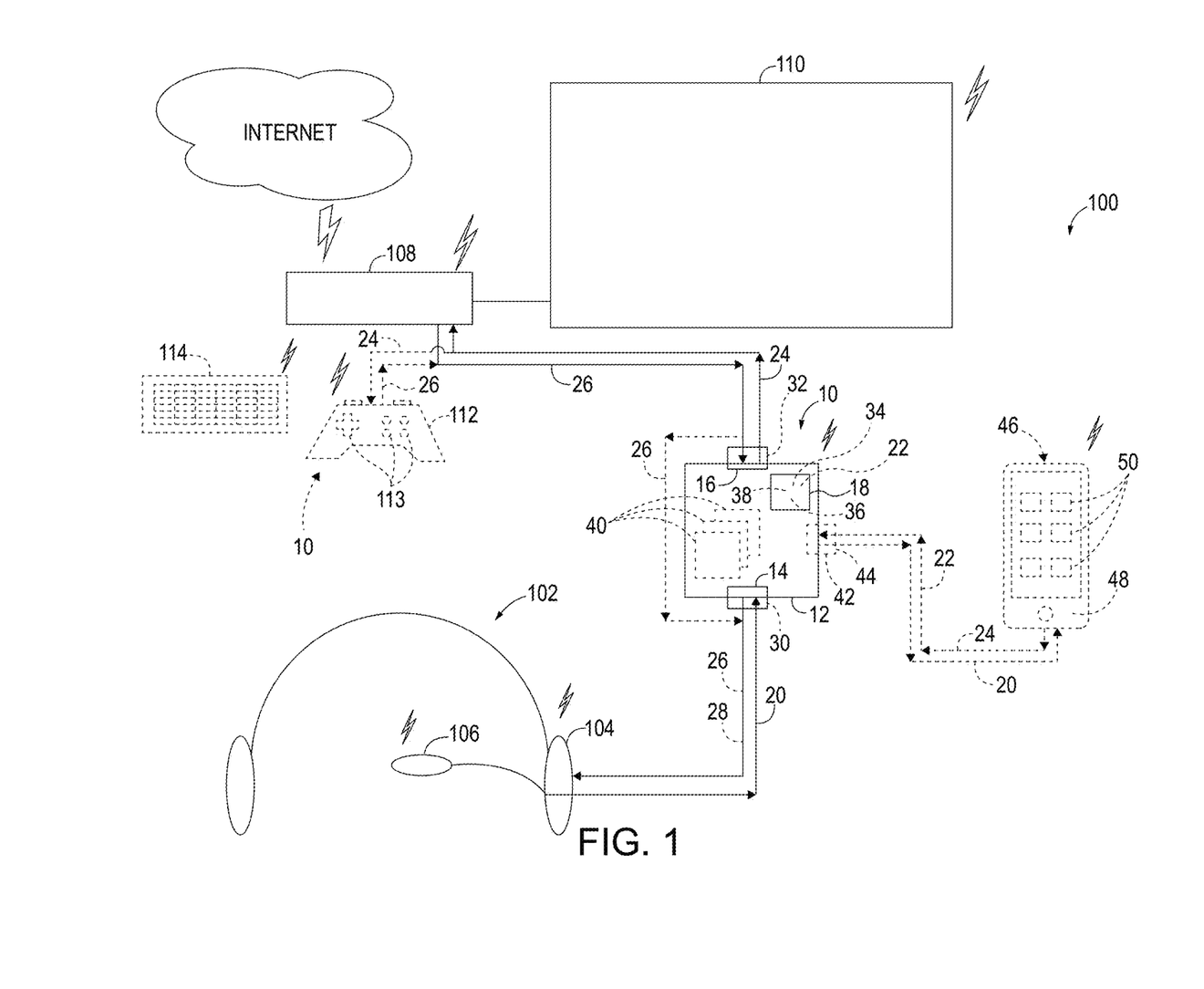
FIG. 1 is a schematic diagram representing example gaming environments including example audio devices according to the present disclosure.
Figure 2:
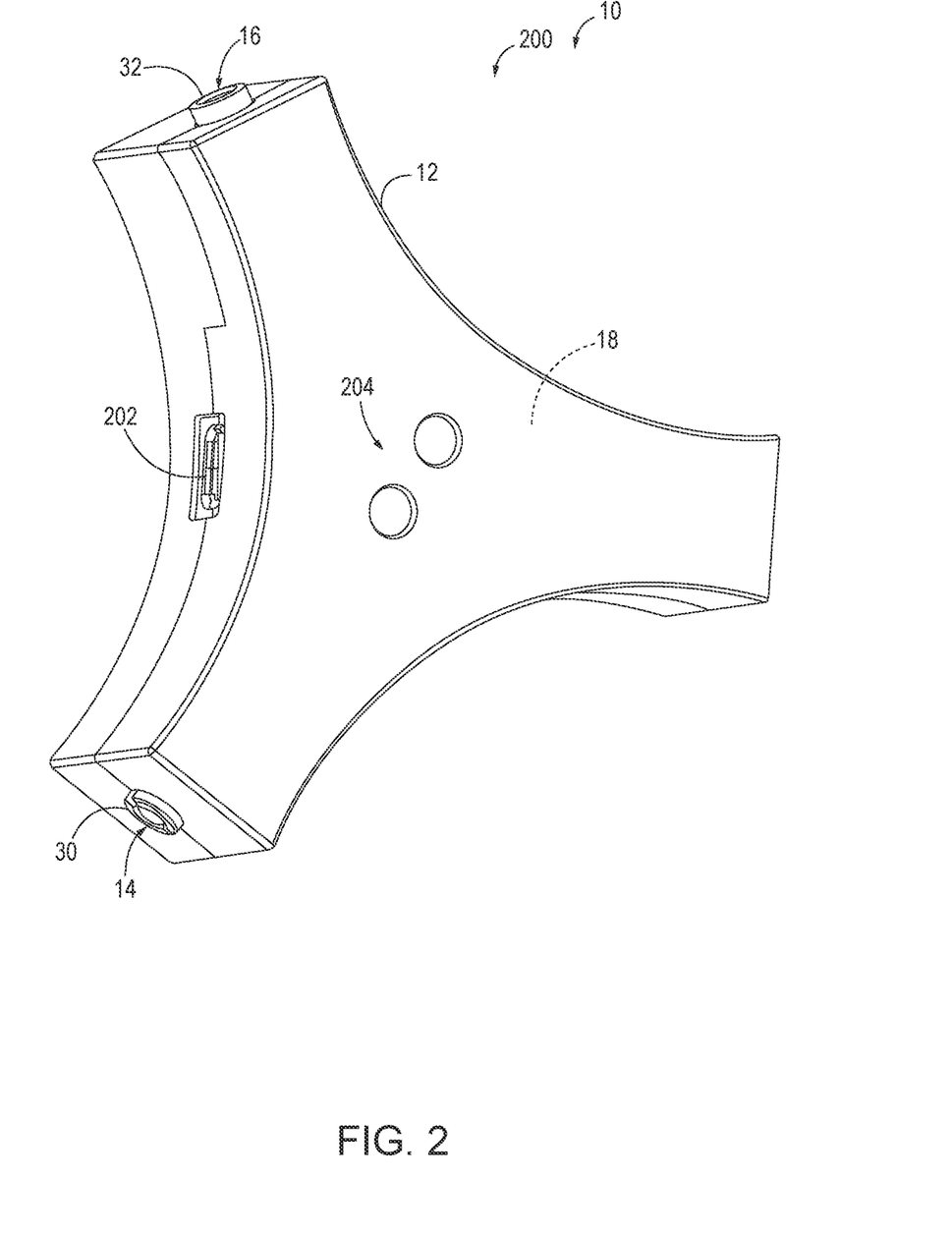
FIG. 2 is a perspective view of an example audio device according to the present disclosure.
Figure 3:
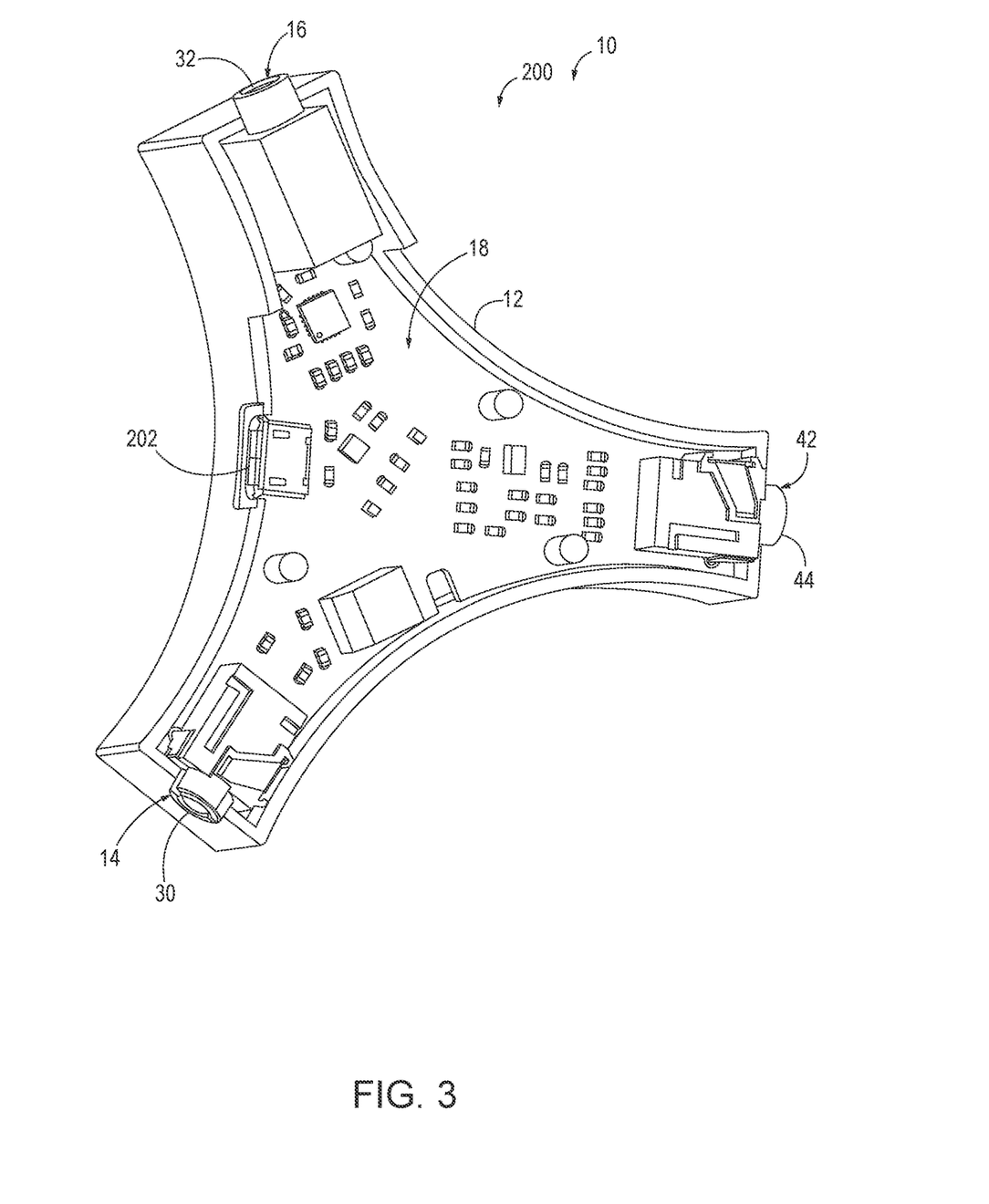
FIG. 3 is a perspective view of the example audio device of FIG. 2, shown with a portion of the housing removed.
Figure 4:
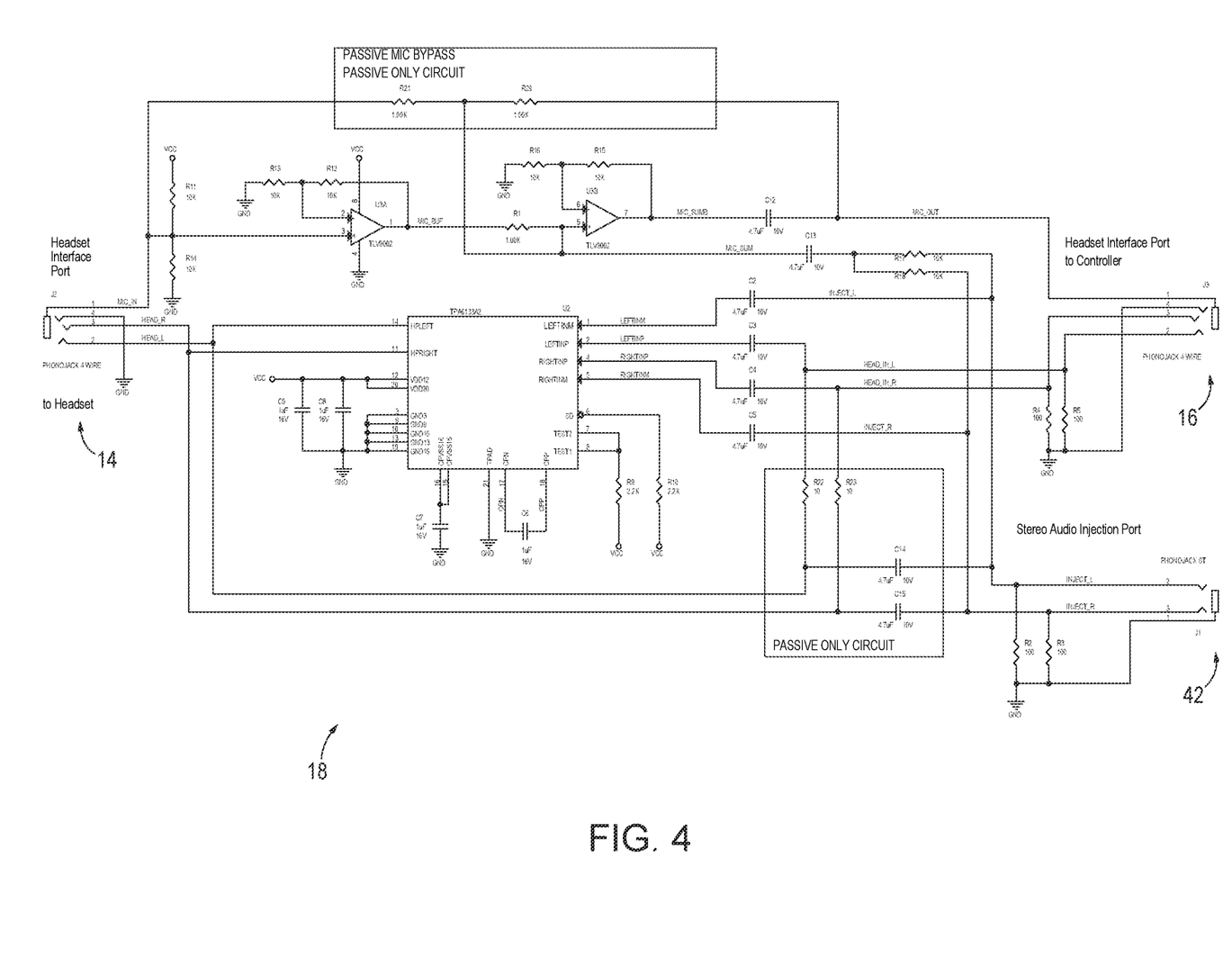
FIG. 4 is a wiring diagram of an example audio device according to the present disclosure.
Figure 5:
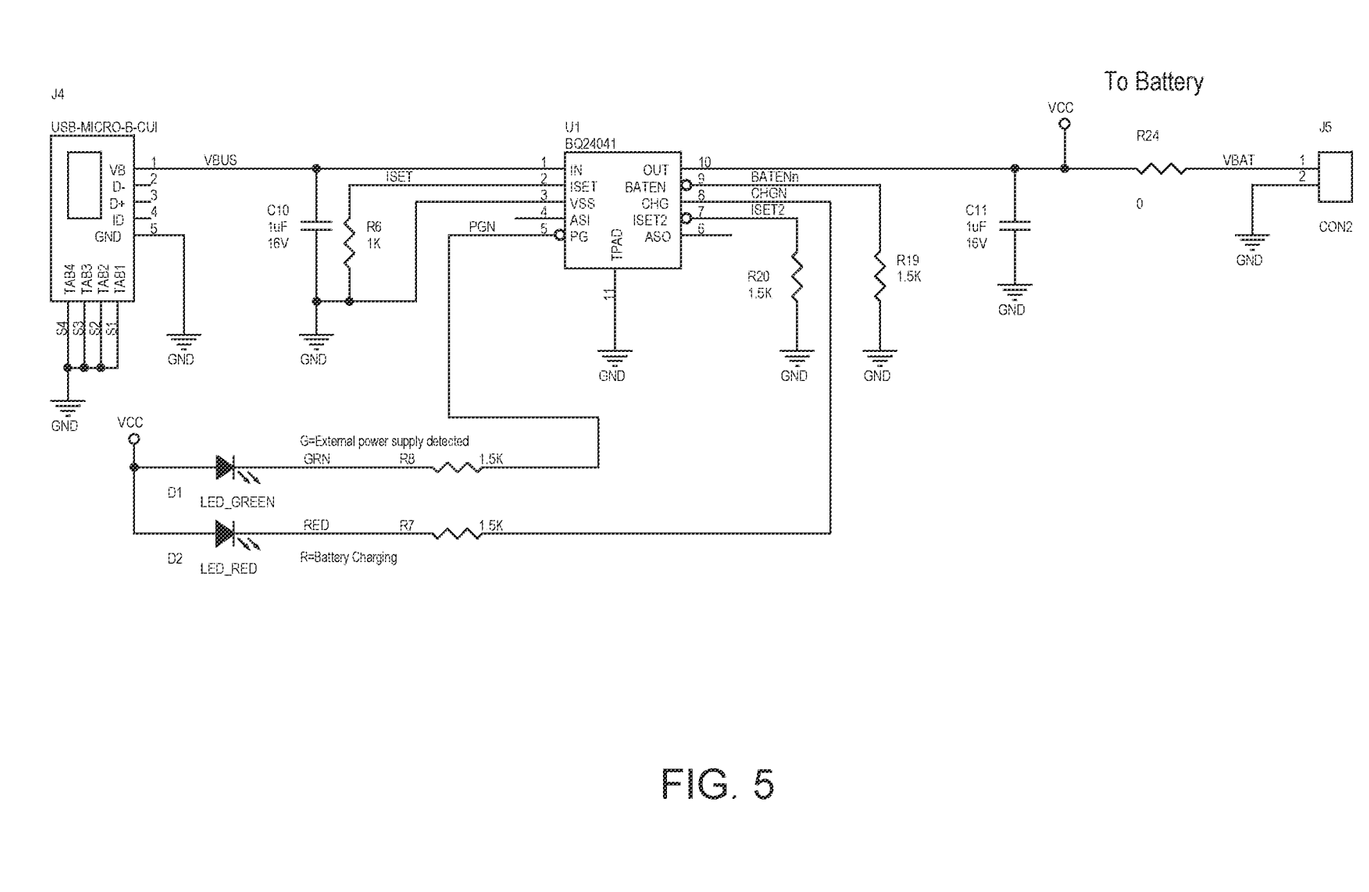
FIG. 5 is a wiring diagram of a battery charge circuit that may be incorporated into an audio device according to the present disclosure.

The present disclosure is directed to audio devices 10, audio systems 100, and associated software and methods. FIG. 1 schematically illustrates example audio systems 100. Generally, in FIG. 1, elements that are likely to be included in a given example are illustrated in solid lines, while elements that are optional to a given example or correspond to alternative examples are illustrated in broken lines. However, elements that are illustrated in solid lines are not essential to all examples of the present disclosure, and an element shown in solid lines may be omitted from a particular example without departing from the scope of the present disclosure.

As schematically represented in FIG. 1, audio systems 100 typically comprise at least a computer 108, a display device 110, a speaker 104, and a microphone 106. An audio system 100, for example, may be, or may be a component or feature of, a gaming system configured for interactive game play over the Internet. In such gaming systems, a player may interact audibly with fellow players via the speaker 104 and the microphone 106. In the schematic illustration of FIG. 1, the speaker 104 and the microphone 106 are components of an audio headset 102, which often are used in gaming systems; however, stand-alone, or separate, speakers and microphones also may be incorporated into an audio system 100. Computer 108 may take any suitable form such that it is configured to enable interactive game play via the Internet, examples of which include personal computers, dedicated gaming computers, tablets, smart phones, set-top boxes, smart TVs, connected TVs, and gaming consoles, such as those sold under the PLAYSTATION, NINTENDO, and XBOX brands. Display device 110 also may take any suitable form, examples of which include televisions, computer monitors, and displays that are integral or otherwise attached to the computer 108. As schematically illustrated in FIG. 1, audio systems 100 or computers 108 thereof also may comprise user input devices, such as a game controller 112 and/or a keyboard 114. When present, the game controller 112 may comprise user controls 113 that are configured to control a game character in a virtual game environment. Other examples of user input devices include joysticks, steering wheels, pedals, trackpads, roller balls, paddle controllers, guns, instruments, etc. In FIG. 1 various connections between elements of audio systems 100 may be wired or wireless, with wireless connections schematically represented by lightning bolts.

An enjoyable part of interactive game play over the Internet is the ability to interact with fellow gamers. This typically is done by wearing an audio headset 102 that is operatively connected to the computer 108, either via a wired connection or via a wireless connection (e.g., BLUETOOTH connection), and optionally via a user input device, such as a game controller 112. When speaking into the microphone 106, a player's voice will be transmitted to the Internet via the computer 108 and into the game environment. The sounds of the game environment, including the players' voices are transmitted via the Internet to the computer 108 and to the speaker 104. The audio systems 100, audio devices 10, and related software and methods herein enable players to add sound bites 22 to the audio signals that are being sent to the game environment during interactive game play. As used herein, a sound bite 22 is a prerecorded or saved audio file, typically of short duration, such as (but not limited to) less than thirty seconds, less than twenty seconds, less than ten seconds, less than five seconds, and/or greater than 0.5 seconds. Sound bites 22 may include sound effects, such as explosions, bangs, pops, fart sounds, burp sounds, and the like, may include content originating from popular culture or media, such as catch phrases and/or clips from movies or TV shows, etc. Accordingly, during interactive game play, a player may selectively choose to insert a sound bite 22 into the audio signal that is sent to the game environment, so that the other players will hear the sound bite 22. While discussed generally in terms of gaming systems and gaming environments, audio systems 100, audio devices 10, and related methods and software are not limited to being used in a gaming environment. As non-exclusive examples, audio devices 10 may be used with music production systems, music performance systems, drum machines, synthesizers, electric instruments, electric guitars, guitar pedals, effects pedals, and the like.

Some audio systems 100 comprise an audio device 10. As schematically represented in FIG. 1, some audio devices 10 comprise a housing 12, a first audio connection 14 that is supported by the housing 12, a second audio connection 16 that is supported by the housing 12, and a controller 18 that is supported by the housing 12. As used herein, "supported by" means operatively coupled to, generally in a fixed position relative to, but does not require direct physical contact in all examples. For example, in some examples, the first audio connection 14 and the second audio connection 16 may be directly coupled to the controller 18, which in turn is directly coupled to the housing 12, while the first audio connection 14 and the second audio connection 16 do not physically engage the housing 12. In other examples, the first and second audio connections do physically engage and directly contact the housing 12.

Audio devices 10 may be stand-alone devices separate from other components of audio systems 100, such as schematically illustrated in FIG. 1. However, it is within the scope of the present disclosure that an audio device 10 may be incorporated into, integral with, or supported directly by another components of an audio system 100, such as (but not limited to) an audio headset 102, a microphone 106, a game controller 112, a keyboard 114, an instrument, a guitar pedal, an effects pedal, and so forth.

As schematically represented in FIG. 1, in some examples of audio device 10, the controller 18 is configured to receive an input audio signal 20 via the first audio connection 14, combine the input audio signal 20 with a sound bite 22 to create an output audio signal 24, and transmit the output audio signal 24 via the second audio connection 16. For example, the input audio signal 20 may originate from a microphone 106 of an audio headset 102, and the output audio signal 24 may be transmitted to a computer 108 for subsequent transmission to a gaming environment via the Internet. The audio device 10 may combine the input audio signal 20 with the sound bite 22 in any suitable manner. For example, the output audio signal 24 may in fact be two separate signals that are simultaneously transmitted, or the output audio signal 24 may be a stand-alone signal in which the sound bite 22 was added to the input audio signal 20, such as via a microprocessor. The output audio signal 24 may be sent directly to the computer 108, or as schematically and optionally represented in FIG. 1, the output audio signal 24 may be sent to the computer 108 via a game controller 112.

The controller 18 of an audio device 10 may be any suitable device or devices that are configured to perform the functions of the controller 18 discussed herein. For example, the controller 18 may comprise one or more of an electronic controller, a dedicated controller, a special-purpose controller, a microprocessor, a circuit board, electronic hardware, a display device, a logic device, a memory device, and/or a memory device having computer readable media suitable for storing computer-executable instructions for implementing aspects of audio devices 10 and/or methods according to the present disclosure.

In some examples of audio device 10, the controller 18 also is configured to receive a return audio signal 26 via the second audio connection 16, and to transmit the return audio signal 26 via the first audio connection 14. For example, the return audio signal 26 may be transmitted from the computer 108 and originate from the gaming environment via the Internet, such as including sounds associated with the gaming environment and in some instances including the voices of fellow players playing within the online gaming environment. If fellow players also are using an audio system 100 and/or audio device 10, then sound bites 22 may originate from fellow players as well, and be transmitted as part of the return audio signal 26. The return audio signal 26 may be sent directly from the computer 108 to the second audio connection 16, or as schematically and optionally represented in FIG. 1, the return audio signal 26 may be sent to the second audio connection 16 the via a game controller 112.

In some such audio devices 10, the controller 18 also is configured to combine the return audio signal 26 with the sound bite 22 to create a combined return audio signal 28, and to transmit the combined return audio signal 28 via the first audio connection 14. In other words, in such examples, not only is the sound bite 22 added to the input audio signal 20, but it also is added to the return audio signal 26 so that the user of the audio device 10 will hear the sound bite 22 via the speaker 104 in real time or near real time without the sound bite 22 needing to travel to the computer 108, to the gaming environment via the Internet, back to the computer 108 via the Internet, and ultimately back to the speaker 104.

In other examples, and as schematically and optionally represented in FIG. 1 in dashed lines, the return audio signal 26 may bypass the controller 18, and even the audio device 10 altogether, and be sent directly to the speaker 104.

The audio connections of audio devices 10 may take any suitable form, such that they are configured to receive and transmit corresponding audio signals. In some examples, such as when an audio device 10 is separate from other component of an audio system 100, the audio connections comprise audio jacks, such as typical 3.5 mm audio jacks; however, other examples of physical/electrical jacks also may be incorporated in audio devices 10 as audio connections, such as (but not limited to) Universal Serial Bus (USB) connectors. FIG. 1 schematically represents that the first audio connection 14 may comprise a first audio jack 30 and that the second audio connection 16 may comprise a second audio jack 32.

Additionally or alternatively, in some examples of audio devices 10, the controller 18 comprises one or more wireless transceivers 34. In such examples, the one or more wireless transceivers 34 may comprise the first audio connection 14 and the second audio connection 16.

As schematically represented in FIG. 1, in some examples of audio devices 10, the controller 18 comprises memory media 36, and the sound bite 22 is stored on the memory media 36. In some such examples, the memory media 36 stores a plurality of audio files 38, and the sound bite 22 is selected from the plurality of audio files 38. Accordingly, in some examples, the audio device 10 further comprises one or more user engagements 40 that are supported by the housing 12 and that are operatively coupled to the controller 18. In such examples, the controller 18 is configured to combine the input audio signal 20 with the sound bite 22 to create the output audio signal 24 responsive to user engagement of the one or more user engagements 40. That is, when a user engages a user engagement 40, the sound bite 22 is added to the input audio signal and is sent to the computer 108 therewith. User engagements 40 may take any suitable form, such as buttons, dials, levers, touch screens, etc.

In some such examples, the one or more user engagements 40 comprises a plurality of user engagements 40 and each of the plurality of user engagements 40 corresponds to a single audio file 38 of the plurality of audio files 38. Accordingly, a user may select from amongst the plurality of audio files 38 to select a specific sound bite 22 for combination with the input audio signal 20.

In some examples of audio devices 10, the controller 18 also is configured to record the sound bite 22 on the memory media 36 from the input audio signal 20 via the first audio connection 14. In other words, a user of an audio device 10 may record custom sound bites 22 via the microphone 106. In such examples, user engagements 40 may include a record button, or the like, and the controller 18 may be appropriately configured to record a sound bite 22 as an audio file 38 and have it selectively assigned to a user engagement 40 for subsequent combination with the input audio signal 20 during subsequent use of the audio device 10.

Additionally or alternatively, in some examples of audio devices 10, the controller 18 is configured to receive prerecorded audio files and save the prerecorded audio files on the memory media 36. For example, the audio device 10 may comprise a USB, Ethernet, or other port through which audio files may be loaded onto the memory media and assigned to a user engagement 40 for subsequent use of an audio file as a sound bite 22. Additionally or alternatively, an audio device 10 may be configured to wirelessly connect to a computing device or the Internet for receipt of prerecorded audio files therefrom.

With continued reference to FIG. 1, some examples of audio devices 10 further comprise a third audio connection 42 that is supported by the housing 12. In such examples, the controller 18 is configured to receive the sound bite 22 via the third audio connection 42. In such examples, the controller 18 may comprise memory media 36 that stores one or more sound bites 22 or the controller may not comprise memory media 36 that stores one or more sound bites 22.

Like the first and second audio connections, the third audio connection 42 may take any suitable form, such that it is configured to receive and transmit audio signals. In some examples, the third audio connection 42 comprises a third audio jack 44. Additionally or alternatively, the controller 18 may comprise one or more wireless transceivers 34, which may comprise the third audio connection 42.

With continued reference to FIG. 1, an audio system 100 with an audio device 10 also may comprise computer readable storage media 48 comprising computer executable instructions that, when executed, direct a computing device 46 to receive a user input, and transmit the sound bite 22 to the audio device 10 responsive to receipt of the user input. That is, an audio system 100 may comprise software that is configured to run on a computing device 46 and also is configured to interact with the audio device 10. In the schematic example of FIG. 1, computing device 46 takes the form of a smart phone; however, other examples of computing devices may be used, including tablets, personal computers, and the like. In some examples, the software may be described as a mobile application, or an app.

Computer readable storage media 48 also may be described as non-transitory computer readable storage, or memory, media suitable for storing computer-executable instructions, or software, for implementing methods or steps of methods or systems according to the present disclosure. Examples of such media include CD-ROMs, disks, hard drives, flash memory, etc. As used herein, storage, or memory, devices and media having computer-executable instructions as well as computer-implemented methods and other methods according to the present disclosure are considered to be within the scope of subject matter deemed patentable in accordance with Section 101 of Title 35 of the United States Code.

In some examples of audio systems 100 that comprise software, the computer executable instructions, when executed, further direct the computing device 46 to display representations 50 of a plurality of audio files, such that the user input corresponds to a selected one of the representations 50. For example, if the computing device 46 comprises a touch screen, the representations 50 may take the form of icons or other graphic symbols that are tied or linked to corresponding audio files. The audio files may be stored on the computer readable storage media 48 of the computing device 46 or the audio files may be remotely stored, such as in cloud storage. In some examples, the audio files are stored remotely by a service provider associated with audio devices 10 and/or software according to the present disclosure. In other examples, the audio files are stored remotely by a third-party service, such as an audio- or video-sharing platform such as YouTube™. Accordingly, when a user engages a representation 50, a corresponding audio file (whether stored locally on the computing device 46 or remotely) is transmitted from the computing device 46 to the audio device 10 as a sound bite 22 to be combined with the input audio signal 20 by the controller 18 of the audio device 10 for transmission to the computer 108 as the output audio signal 24. As used herein, an "audio file" may include data in addition to audio data, such as video data, identification data, etc., and is not limited to a file that exclusively has audio data.

In some examples, the computer executable instructions, when executed, further direct the computing device 46 to receive a plurality of audio inputs from a user, and store the plurality of audio inputs to create stored audio inputs, such that the sound bite 22 is one of the stored audio inputs when selected. In other words, a user of an audio system 100 may record custom audio files to be selected from as a sound bite 22 and/or may upload or otherwise transfer to the computing device 46 prerecorded audio files to be selected from as a sound bite 22.

With continued reference to FIG. 1, in some audio devices 10 that comprise three audio connections 14, 16, and 42, the controller 18 is configured to receive an input audio signal 20 via the first audio connection 14, transmit the input audio signal 20 via the third audio connection 42, receive an output audio signal 24 via the third audio connection 42, and transmit the output audio signal 24 via the second audio connection 16. In such examples, and as discussed in connection with the other examples discussed above, the output audio signal 24 comprises the input audio signal 20 combined with a sound bite 22. However, rather than the controller 18 combining the input audio signal 20 with the sound bite 22, the audio device 10 receives the output audio signal 24 via the third audio connection 42 from a separate device, such as via a computing device 46 running software.

In some such examples of audio devices 10, the controller 18 also is configured to receive a return audio signal 26 via the second audio connection 16, and to transmit the return audio signal 26 via the first audio connection 14.

In some such examples, the controller 18 also is configured to combine the return audio signal 26 with the sound bite 22 to create a combined return audio signal 28, and to transmit the combined return audio signal 28 via the first audio connection 14. For example, the controller 18 may be configured to receive the sound bite 22 from the output audio signal 24 for combination with the return audio signal 26 to create the combined return audio signal 28. In other words, in such examples, the sound bite 22 may be extracted from the output audio signal 24 by the controller 18 and added to the return audio signal 26 so that the user of an audio device 10 will hear the sound bite 22 via the speaker 104 in real time or near real time without the sound bite 22 needing to travel to the computer 108, to the gaming environment via the Internet, back to the computer 108 via the Internet, and ultimately back to the speaker 104. Alternatively, rather than extracting the sound bite 22 from the output audio signal 24, the controller 18 may receive the sound bite 22 separately from the output audio signal via the third audio connection 42 for combination with the return audio signal 26 to create the combined return audio signal 28. That is, the computing device 46 and its software may separately transmit the sound bite 22 both as part of the output audio signal 24 and on its own, such that the controller 18 need not extract the sound bite 22 from the output audio signal 24 to combine the sound bite 22 with the return audio signal 26 to create the combined return audio signal 28.

An audio system 100 that comprises an audio device 10 whose controller 18 is configured to receive the output audio signal 24 via the third audio connection 42 may be used in combination with software. That is, such audio systems 100 may further comprise computer readable storage media 48 comprising computer executable instructions that, when executed, direct a computing device 46 to receive a user input, receive the input audio signal 20 from the audio device 10, combine the input audio signal 20 with the sound bite 22 to create the output audio signal 24 responsive to receipt of the user input, and transmit the output audio signal 24 to the audio device 10. The various optional functions of the software discussed above in connection with other audio systems 100 also may be incorporated into software according to these audio systems 100.

Also within the scope of the present disclosure is software for running a computing device 46, but with which an audio device 10 is not needed to functionally enable a user to combine a sound bite 22 with an input audio signal 20 for sending to a computer 108 and ultimately to a gaming (or other) environment via the Internet. Such software may be described as computer readable storage media comprising computer executable instructions that, when executed, direct a computing device 46 to receive a user input, receive an input audio signal 20, combine the input audio signal 20 with a sound bite 22 to create an output audio signal 24 responsive to receipt of the user input, and transmit the output audio signal 24. For example, the input audio signal 20 may be received via a microphone of, or connected to, the computing device 46, and the output audio signal 24 may be transmitted via a wired connection or a wireless connection to a computer 108 for subsequent transmission to a gaming environment via the Internet.

As with the software discussed above that is used in connection with an audio device 10, in some examples of such software that do not require an audio device 10, the computer executable instructions, when executed, further direct the computing device 46 to display representations 50 of a plurality of audio files, such that the user input corresponds to a selected one of the representations 50. Also similarly, in some examples, the computer executable instructions, when executed, further direct the computing device 46 to receive a plurality of audio inputs from a user, and store the plurality of audio inputs to create stored audio inputs, such that the sound bite 22 is one of the stored audio inputs when selected. In other words, a user of an audio system 100 may record custom audio files to be selected from as a sound bite 22 and/or may upload or otherwise transfer to the computing device 46 prerecorded audio files to be selected from as a sound bite 22.

Turning now to FIGS. 2-5, an illustrative non-exclusive example of an audio device 10 in form of example audio device 200 and its controller 18 is illustrated. Where appropriate, the reference numerals from the schematic illustration of FIG. 1 are used to designate corresponding parts of audio device 200; however, the example of FIGS. 2-5 is non-exclusive and does not limit audio device 10 to the illustrated embodiment of audio device 200. That is, audio devices 10 are not limited to the specific embodiment of the illustrated audio device 200, and audio devices 10 may incorporate any number of the various aspects, configurations, characteristics, properties, etc. of audio devices 10 that are illustrated in and discussed with reference to the schematic representation of FIG. 1 and/or the embodiment of FIGS. 2-5, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to audio device 200; however, it is within the scope of the present disclosure that the previously discussed features, variants, etc. may be utilized with audio device 200.

Audio device 200 is an example of an audio device 10 that comprises three audio connections in the form of audio jacks 30, 32, and 44 and that is configured to be used with an audio system 100 that also comprises software for operation on a computing device 46. In particular, the controller 18 of audio device 200 is configured to receive a sound bite 22 via the third audio connection 42 from the computing device 46 and combine the sound bite 22 with an input audio signal 20 that is received via the first audio connection 14. The controller 18 is configured to combine the sound bite 22 with the input audio signal 20 to create an output audio signal 24 for transmission to a computer 108 via the second audio connection 16.

Audio device 200 also includes a charging port 202 for enabling the charging of an internal battery, as well as a user display 204 in the form of two LEDs whose operation are responsive to a charge state of the internal battery. Other audio devices 10 according to the present disclosure may not need an internal battery and may receive sufficient power via the audio signals received by the audio device 10 or via the third audio connection 42 with the computing device 46.

Illustrative, non-exclusive examples of inventive subject matter according to the present disclosure are described in the following enumerated paragraphs:

A. An audio device (10), comprising:
a housing (12);
a first audio connection (14) supported by the housing (12);
a second audio connection (16) supported by the housing (12); and
a controller (18) supported by the housing (12), wherein the controller (18) is configured to:
receive an input audio signal (20) via the first audio connection (14);
combine the input audio signal (20) with a sound bite (22) to create an output audio signal (24); and
transmit the output audio signal (24) via the second audio connection (16).

A1. The audio device (10) of paragraph A, wherein the controller (18) is configured to:
receive a return audio signal (26) via the second audio connection (16); and
transmit the return audio signal (26) via the first audio connection (14).

A1.1. The audio device (10) of paragraph A1, wherein the controller (18) is configured to:
combine the return audio signal (26) with the sound bite (22) to create a combined return audio signal (28); and
transmit the combined return audio signal (28) via the first audio connection (14).

A2. The audio device (10) of any of paragraphs A-A1.1, wherein the first audio connection (14) comprises a first audio jack (30).

A3. The audio device (10) of any of paragraphs A-A2, wherein the second audio connection (16) comprises a second audio jack (32).

A4. The audio device (10) of any of paragraphs A-A3, wherein the controller (18) comprises one or more wireless transceivers (34), and wherein the one or more wireless transceivers (34) comprise the first audio connection (14) and the second audio connection (16).

A5. The audio device (10) of any of paragraphs A-A4, wherein the controller (18) comprises memory media (36), wherein the sound bite (22) is stored on the memory media (36).

A5.1. The audio device (10) of paragraph A5, wherein the memory media (36) stores a plurality of audio files (38), and wherein the sound bite (22) is selected from the plurality of audio files (38).

A5.2. The audio device (10) of any of paragraphs A5-A5.1, further comprising:
one or more user engagements (40) supported by the housing (12) and operatively coupled to the controller (18);
wherein the controller (18) is configured to combine the input audio signal (20) with the sound bite (22) to create the output audio signal (24) responsive to user engagement of the one or more user engagements (40).

A5.2.1. The audio device (10) of paragraph A5.2, wherein the one or more user engagements (40) comprises a plurality of user engagements (40), and wherein each user engagement of the plurality of user engagements (40) corresponds to a single audio file (38) of the plurality of audio files (38).

A5.3. The audio device (10) of any of paragraphs A5-A5.2.1, wherein the controller (18) is configured to record the sound bite (22) on the memory media (36) from the input audio signal (20) via the first audio connection (14).

A5.4. The audio device (10) of any of paragraphs A5-A5.3, wherein the controller (18) is configured to receive prerecorded audio files and save the prerecorded audio files on the memory media (36).

A6. The audio device (10) of any of paragraphs A-A5.4, further comprising:
a third audio connection (42) supported by the housing (12);
wherein the controller (18) is configured to receive the sound bite (22) via the third audio connection (42).

A6.1. The audio device (10) of paragraph A6, wherein the third audio connection (42) comprises a third audio jack (44).

A6.2. The audio device (10) of any of paragraphs A6-A6.1 when depending from paragraph A4, wherein the one or more wireless transceivers (34) comprises the third audio connection (42).

A7. An audio system (100), comprising:
the audio device (10) of any of paragraphs A-A6.2; and
computer readable storage media (48) comprising computer executable instructions that, when executed, direct a computing device (46) to:
receive a user input; and
transmit the sound bite (22) to the audio device (10) responsive to receipt of the user input.

A7.1. The audio system (100) of paragraph A7, wherein the computer executable instructions, when executed, further direct the computing device (46) to display representations (50) of a/the plurality of audio files (38), wherein the user input corresponds to a selected one of the representations (50).

A7.2. The audio system (100) of any of paragraphs A7-A7.1, wherein the computer executable instructions, when executed, further direct the computing device (46) to:
receive a plurality of audio inputs from a user; and
store the plurality of audio inputs to create stored audio inputs;
wherein the sound bite (22) is one of the stored audio inputs.

B. An audio device (10), comprising:
a housing (12);
a first audio connection (14) supported by the housing (12);
a second audio connection (16) supported by the housing (12);
a third audio connection (42) supported by the housing (12); and
a controller (18) supported by the housing (12), wherein the controller (18) is configured to:
receive an input audio signal (20) via the first audio connection (14);
transmit the input audio signal (20) via the third audio connection (42);
receive an output audio signal (24) via the third audio connection (42), wherein the output audio signal (24) comprises the input audio signal (20) combined with a sound bite (22); and
transmit the output audio signal (24) via the second audio connection (16).

B1. The audio device (10) of paragraph B, wherein the controller (18) is configured to:
receive a return audio signal (26) via the second audio connection (16); and
transmit the return audio signal (26) via the first audio connection (14).

B1.1. The audio device (10) of paragraph B1, wherein the controller (18) is configured to:
combine the return audio signal (26) with the sound bite (22) to create a combined return audio signal (28); and
transmit the combined return audio signal (28) via the first audio connection (14).

B1.1.1. The audio device (10) of paragraph B1.1, wherein the controller (18) is configured to receive the sound bite (22) from the output audio signal (24) for combination with the return audio signal (26) to create the combined return audio signal (28).

B1.1.2. The audio device (10) of paragraph B1.1, wherein the controller (18) is configured to receive the sound bite (22) via the third audio connection (42) for combination with the return audio signal (26) to create the combined return audio signal (28).

B2. The audio device (10) of any of paragraphs B-B1.1.2, wherein the first audio connection (14) comprises a first audio jack (30).

B3. The audio device (10) of any of paragraphs B-B2, wherein the second audio connection (16) comprises a second audio jack (32).

B4. The audio device (10) of any of paragraphs B-B3, wherein the third audio connection (42) comprises a third audio jack (44).

B5. The audio device (10) of any of paragraphs B-B4, wherein the controller (18) comprises one or more wireless transceivers (34), and wherein the one or more wireless transceivers (34) comprise the first audio connection (14), the second audio connection (16), and the third audio connection (42).

B6. An audio system (100), comprising:
the audio device (10) of any of paragraphs B-B5; and
computer readable storage media (48) comprising computer executable instructions that, when executed, direct a computing device (46) to:
receive a user input;
receive the input audio signal (20) from the audio device (10);
combine the input audio signal (20) with the sound bite (22) to create the output audio signal (24) responsive to receipt of the user input; and
transmit the output audio signal (24) to the audio device (10).

B6.1. The audio system (100) of paragraph B6, wherein the computer executable instructions, when executed, further direct the computing device (46) to display representations (50) of a plurality of audio files (38), wherein the user input corresponds to a selected one of the representations (50).

B6.2. The audio system (100) of any of paragraphs B6-B6.1, wherein the computer executable instructions, when executed, further direct the computing device (46) to:
receive a plurality of audio inputs from a user; and
store the plurality of audio inputs to create stored audio inputs;
wherein the sound bite (22) is one of the stored audio inputs.

C. Computer readable storage media comprising computer executable instructions that, when executed, direct a computing device (46) to:
receive a user input; and
transmit a sound bite (22) to an audio device (10) responsive to receipt of the user input.

C1. The computer readable storage media of paragraph C, wherein the computer executable instructions, when executed, further direct the computing device (46) to display representations (50) of a plurality of audio files (38), wherein the user input corresponds to a selected one of the representations.

C2. The computer readable storage media of any of paragraphs C-C1, wherein the computer executable instructions, when executed, further direct the computing device (46) to:
receive a plurality of audio inputs from a user; and
store the plurality of audio inputs to create stored audio inputs;
wherein the sound bite (22) is one of the stored audio inputs.

D. Computer readable storage media comprising computer executable instructions that, when executed, direct a computing device (46) to:
receive a user input;
receive an input audio signal (20);
combine the input audio signal (20) with a sound bite (22) to create an output audio signal (24) responsive to receipt of the user input; and
transmit the output audio signal (24).

D1. The computer readable storage media of paragraph D, wherein the computer executable instructions, when executed, further direct the computing device (46) to display representations (50) of a plurality of audio files (38), wherein the user input corresponds to a selected one of the representations (50).

D2. The computer readable storage media of any of paragraphs D-D1, wherein the computer executable instructions, when executed, further direct the computing device (46) to:
receive a plurality of audio inputs from a user; and
store the plurality of audio inputs to create stored audio inputs;
wherein the sound bite (22) is one of the stored audio inputs.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An audio system, comprising:
a game controller for a gaming system, comprising:
a housing;
user controls supported by the housing and configured to control a game character in a virtual game environment;
a first audio connection supported by the housing;
a second audio connection supported by the housing;
a third audio connection supported by the housing; and
an electronic controller supported by the housing, wherein the electronic controller is configured to:
receive an input audio signal via the first audio connection;
receive a sound bite via the third audio connection;
combine the input audio signal with the sound bite to create an output audio signal;
transmit the output audio signal via the second audio connection;
receive a return audio signal via the second audio connection; and
transmit the return audio signal via the first audio connection; and
computer readable storage media comprising computer executable instructions that, when executed, direct a computing device to:
display representations of a plurality of audio files;
receive a user input corresponding to a selected one of the representations; and
transmit the sound bite to the game controller via the third audio connection responsive to receipt of the user input.

2. The audio system of claim 1, wherein the sound bite is less than thirty seconds.

3. Non-transitory computer readable storage media comprising computer executable instructions configured for use in connection with a game controller for a gaming system comprising a housing, user controls supported by the housing and configured to control a game character in a virtual game environment, a first audio connection supported by the housing, a second audio connection supported by the housing, a third audio connection supported by the housing, and an electronic controller supported by the housing, wherein the electronic controller is configured to receive an input audio signal via the first audio connection, receive a sound bite via the third audio connection, combine the input audio signal with the sound bite to create an output audio signal, transmit the output audio signal via the second audio connection, receive a return audio signal via the second audio connection, and transmit the return audio signal via the first audio connection, wherein the computer executable instructions, when executed, direct a computing device to:
display representations of a plurality of audio files;
receive a user input corresponding to a selected one of the representations; and
transmit the sound bite to the game controller via the third audio connection responsive to receipt of the user input.

4. The non-transitory computer readable storage media of claim 3, wherein the sound bite is less than thirty seconds.

5. A game controller for a gaming system, comprising:
a housing;
user controls supported by the housing and configured to control a game character in a virtual game environment;
a first audio connection supported by the housing;
a second audio connection supported by the housing; and
an electronic controller supported by the housing, wherein the electronic controller is configured to:
receive an input audio signal via the first audio connection;
combine the input audio signal with a sound bite to create an output audio signal; and
transmit the output audio signal via the second audio connection.

6. The game controller of claim 5, wherein the electronic controller is configured to:
receive a return audio signal via the second audio connection; and
transmit the return audio signal via the first audio connection.

7. The game controller of claim 6, wherein the electronic controller is configured to:
combine the return audio signal with the sound bite to create a combined return audio signal; and
transmit the combined return audio signal via the first audio connection.

8. The game controller of claim 5, wherein the first audio connection comprises a first audio jack, and wherein the second audio connection comprises a second audio jack.

9. The game controller of claim 5, wherein the electronic controller comprises one or more wireless transceivers, and wherein the one or more wireless transceivers comprise the first audio connection and the second audio connection.

10. The game controller of claim 5, wherein the electronic controller comprises memory media, wherein the sound bite is stored on the memory media.

11. The game controller of claim 10, further comprising one or more user engagements supported by the housing and operatively coupled to the electronic controller;
wherein the memory media stores a plurality of audio files; and
wherein the electronic controller is configured to combine the input audio signal with the sound bite to create the output audio signal responsive to user engagement of the one or more user engagements; and
wherein the sound bite corresponds to a selected one of the plurality of audio files.

12. The game controller of claim 10, wherein the electronic controller is configured to record the sound bite on the memory media from the input audio signal via the first audio connection.

13. The game controller of claim 10, wherein the electronic controller is configured to receive prerecorded audio files and save the prerecorded audio files on the memory media.

14. The game controller of claim 5, further comprising:
a third audio connection supported by the housing;
wherein the electronic controller is configured to receive the sound bite via the third audio connection.

15. The game controller of claim 14, wherein the first audio connection comprises a first audio jack, wherein the second audio connection comprises a second audio jack, and wherein the third audio connection comprises a third audio jack.

16. The game controller of claim 14, wherein the first audio connection comprises a first audio jack, wherein the second audio connection comprises a second audio jack, and wherein the third audio connection comprises a wireless transceiver.

17. An audio system, comprising:
the game controller of claim 5; and
computer readable storage media comprising computer executable instructions that, when executed, direct a computing device to:
receive a user input; and
transmit the sound bite to the game controller responsive to receipt of the user input.

18. The game controller of claim 5, wherein the sound bite is less than thirty seconds.

19. A game controller for a gaming system, comprising:
a housing;
user controls supported by the housing and configured to control a game character in a virtual game environment;
a first audio connection supported by the housing;
a second audio connection supported by the housing;
a third audio connection supported by the housing; and
an electronic controller supported by the housing, wherein the electronic controller is configured to:
receive an input audio signal via the first audio connection;
transmit the input audio signal via the third audio connection;
receive an output audio signal via the third audio connection, wherein the output audio signal comprises the input audio signal combined with a sound bite; and
transmit the output audio signal via the second audio connection;
wherein the electronic controller is not configured to combine the input audio signal and the sound bite.

20. The game controller of claim 19, wherein the electronic controller is configured to:
receive a return audio signal via the second audio connection; and
transmit the return audio signal via the first audio connection.

21. The game controller of claim 20, wherein the electronic controller is configured to:
combine the return audio signal with the sound bite to create a combined return audio signal; and
transmit the combined return audio signal via the first audio connection.

22. The game controller of claim 21, wherein the electronic controller is configured to receive the sound bite from the output audio signal for combination with the return audio signal to create the combined return audio signal.

23. An audio system, comprising:
the game controller of claim 19; and
computer readable storage media comprising computer executable instructions that, when executed, direct a computing device to:
receive a user input;
receive the input audio signal from the game controller;
combine the input audio signal with the sound bite to create the output audio signal responsive to receipt of the user input; and
transmit the output audio signal to the game controller.

24. The game controller of claim 19, wherein the sound bite is less than thirty seconds.

* * * * *